United States Patent Office 3,804,853
Patented Apr. 16, 1974

3,804,853
2,5-DIMETHYL-1-PYRROLIDINECARBOXANILIDES AND THIOCARBOXANILIDES
John Joseph D'Amico, Akron, and Frederic Gerald Bollinger, Copley, Ohio, assignors to Monsanto Company, St. Louis, Mo.
No Drawing. Continuation-in-part of abandoned application Ser. No. 848,331, filed Aug. 7, 1969. This application Nov. 15, 1971, Ser. No. 199,013
Int. Cl. C07d 27/04
U.S. Cl. 260—326.4      4 Claims

ABSTRACT OF THE DISCLOSURE

A compound of the formula:

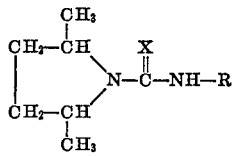

in which X is oxygen or sulfur and R is halophenyl, alkylphenyl, alkylthiophenyl, phenoxyphenyl or trifluoromethylphenyl.

REFERENCE TO RELATED APPLICATIONS

This application is a continuation-in-part of application Ser. No. 848,331 filed Aug. 7, 1969 now abandoned.

BACKGROUND OF THE INVENTION

This invention relates to certain compounds useful for destroying or controlling undesirable vegetation. More particularly it relates to methods of destroying or controlling vegetation which comprises applying thereto a toxic amount of certain ureas or thioureas.

It is known that a heterocyclic secondary amine reacts with phenyl isocyanate to form a substituted urea. The use of phenyl isothiocyanate in place of the isocyanate gives the corresponding thiourea. Our invention concerns the herbicidal activity of certain ureas and thioureas which can be derived from the reaction of 2,5-dimethylpyrrolidine with phenyl isocyanates or phenyl isothiocyanates.

An object of this invention is to provide compositions which are toxic to living plants and to provide methods for their use. One object is to provide a method of destroying noxious vegetation either in the form of germinating seeds or by applying the toxicant directly to the foliage. A further object is to provide now compounds which are outstandingly effective herbicides.

SUMMARY OF THE INVENTION

These and other objects are achieved by use of phytotoxic amount of 2,5 - dimethyl - 1 - pyrrolidinecarboxanilides and thiocarboxanilides.

The 2,5 - dimethyl - 1 - pyrrolidinecarboxanilides and 2,5 - dimethyl - 1 - pyrrolidinethiocarboxanilides of this invention useful both as pre-emergent and contact herbicides have the formula

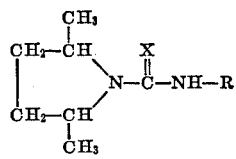

in which X is oxygen or sulfur and R is phenyl, halophenyl, alkylphenyl, nitrophenyl, alkylthiophenyl, haloalkylphenyl, phenoxyphenyl or halophenoxyphenyl. Surprisingly, methyl substitution in the 2,5-position in the pyrrolidine ring is critical for the herbicidal properties observed.

DESCRIPTION OF THE PREFERRED EMBODIMENTS

Our invention comprises applying directly to the plans, or to the soil before the plants emerge, a phytotoxic amount of a compound of the formula

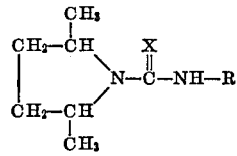

in which X is oxygen or sulfur, R is phenyl, halophenyl, alkylphenyl, nitrophenyl, alkylthiophenyl, haloalkylphenyl, phenoxyphenyl, or halophenoxyphenyl. Preferably R is halophenyl, trifluoromethylphenyl, alkylphenyl, alkylthiophenyl or phenoxyphenyl in which all alkyl or alkylthio embodiments contain one to four carbon atoms.

The ureas and thioureas are not necessarily equivalent and ordinarily, in general usage, the ureas are preferred because of their general herbicidal activity and are particularly useful for application to grass crops to control broadleaf weeds therein. Where X is sulfur, R is preferably 3,4 - dichlorophenyl, 3 - trifluoromethylphenyl, 3-fluorophenyl, 4-fluorophenyl or 3-methylthiophenyl.

Certain substituents on the benzene ring impart phytotoxic specificity toward broadleaf plants. Furthermore, it is observed that the position on the benzene ring affects the herbicidal activity of the compound. The compounds having substituents in the para or meta positions are preferred.

Compounds of this type are

3′-chloro-2,5-dimethyl-1-pyrrolidinecarboxanilide,
4′-chloro-2,5-dimethyl-1-pyrrolidinecarboxanilide,
3′,4′,-dichloro-2,5-dimethyl-1-pyrrolidinecarboxanilide,
3′-fluoro-2,5-dimethyl-1-pyrrolidinecarboxanilide,
4′-fluoro-2,5-dimethyl-1-pyrrolidinecarboxanilide,
3′,4′-difluoro-2,5-dimethyl-1-pyrrolidinecarboxanilide,
3′-bromo-2,5-dimethyl-1-pyrrolidinecarboxanilide,
4′-bromo-2,5-dimethyl-1-pyrrolidinecarboxanilide,
3′,4′-dibromo-2,5-dimethyl-1-pyrrolidinecarboxanlide,
3′-iodo-2,5-dimethyl-1-pyrrolidinecarboxanilide,
4′-iodo-2,5-dimethyl-1-pyrrolidinecarboxanilide,
3′,4′-diiodo-2,5-dimethyl-1-pyrrolidinecarboxanilide,
4′-bromo-3′-chloro-2,5-dimethyl-1-pyrrolidinecarboxanilide,
3′-nitro-2,5-dimethyl-1-pyrrolidinecarboxanilide,
4′-nitro-2,5-dimethyl-1-pyrrolidinecarboxanilide,
3′,4′-dinitro-2,5-dimethyl-1-pyrrolidinecarboxanilide,
3′-methyl-2,5-dimethyl-1-pyrrolidinecarboxanilide,
4′-methyl-2,5-dimethyl-1-pyrrolidinecarboxanilide,
3′,4′-dimethyl-2,5-dimethyl-1-pyrrolidinecarboxanilide,
4′-methyl-3′-chloro-2,5-dimethyl-1-pyrrolidinecarboxanilide,
4′-methyl-3′-fluoro-2,5-dimethyl-1-pyrrolidinecarboxanilide,
3′-(alpha,alpha,alpha-trifluoromethyl)-2,5-dimethyl-1-pyrrolidinecarboxanilide,
4′-(alpha,alpha,alpha-trifluoromethyl)-2,5-dimethyl-1-pyrrolidinecarboxanilide,
3′-(alpha,alpha,alpha-trichloromethyl)-2,5-dimethyl-1-pyrrolidinecarboxanilide,
4′-(alpha,alpha,alpha-trichloromethyl)-2,5-dimethyl-1-pyrrolidinecarboxanilide,
3′-chloro-4′-(alpha,alpha,alpha-trichloromethyl)-2,5-dimethyl-1-pyrrolidinecarboxanilide,
3′-chloro-4′-(alpha,alpha,alpha-trifluoromethyl)-2,5-dimethyl-1-pyrrolidinecarboxanilide,
4′-phenoxy-2,5-dimethyl-1-pyrrolidinecarboxanilide,
3′-phenoxy-2,5-dimethyl-1-pyrrolidinecarboxanilide, 4'-(parachlorophenoxy)-2,5-dimethyl-1-pyrrolidinecarboxanilide,
3'-(parachlorophenoxy)-2,5-dimethyl-1-pyrrolidinecarboxanilide,
4'-(parafluorophenoxy)-2,5-dimethyl-1-pyrrolidinecarboxanilide,
3'-(parafluorophenoxy)-2,5-dimethyl-1-pyrrolidinecarboxanilide,
3'-methylthio-2,5-dimethyl-1-pyrrolidinecarboxanilide,
4'-methylthio-2,5-dimethyl-1-pyrrolidinecarboxanilide,
3'-chloro-2,5-dimethyl-1-pyrrolidinethiocarboxanilide,
4'-chloro-2,5-dimethyl-1-pyrrolidinethiocarboxanilide,
3',4'-dichloro-2,5-dimethyl-1-pyrrolidinethiocarboxanilide,
3'-fluoro-2,5-dimethyl-1-pyrrolidinethiocarboxanilide,
4'-fluoro-2,5-dimethyl-1-pyrrolidinethiocarboxanilide,
3',4'-difluoro-2,5-dimethyl-1-pyrrolidinethiocarboxanilide,
3'-bromo-2,5-dimethyl-1-pyrrolidinethiocarboxanilide,
4'-bromo-2,5-dimethyl-1-pyrrolidinethiocarboxanilide,
3',4'-dibromo-2,5-dimethyl-1-pyrrolidinethiocarboxanilide,
3'-iodo-2,5-dimethyl-1-pyrrolidinethiocarboxanilide,
4'-iodo-2,5-dimethyl-1-pyrrolidinethiocarboxanilide,
3',4'-diiodo-2,5-dimethyl-1-pyrrolidinethiocarboxanilide,
4'-bromo-3'-chloro-2,5-dimethyl-1-pyrrolidinethiocarboxanilide,
3'-nitro-2,5-dimethyl-1-pyrrolidinethiocarboxanilide,
4'-nitro-2,5-dimethyl-1-pyrrolidinethiocarboxanilide,
3',4'-dinitro-2,5-dimethyl-1-pyrrolidinethiocarboxanilide,
3'-methyl-2,5-dimethyl-1-pyrrolidinethiocarboxanilide,
4'-methyl-2,5-dimethyl-1-pyrrolidinethiocarboxanilide,
3',4'-dimethyl-2,5-dimethyl-1-pyrrolidinethiocarboxanilide,
4'-methyl-3'-chloro-2,5-dimethyl-1-pyrrolidinethiocarboxanilide,
4'-methyl-3'-fluoro-2,5-dimethyl-1-pyrrolidinethiocarboxanilide,
3'-(alpha,alpha,alpha-trifluoromethyl)-2,5-dimethyl-1-pyrrolidinethiocarboxanilide,
4'-(alpha,alpha,alpha-trifluoromethyl)-2,5-dimethyl-1-pyrrolidinethiocarboxanilide,
3'-(alpha,alpha,alpha-trichloromethyl)-2,5-dimethyl-1-pyrrolidinethiocarboxanilide,
4'-(alpha,alpha,alpha-trichloromethyl)-2,5-dimethyl-1-pyrrolidinethiocarboxanilide,
3'-chloro-4'-(alpha,alpha,alpha-trichloromethyl)-2,5-dimethyl-1-pyrrolidinethiocarboxanilide,
3'-chloro-4'-(alpha,alpha,alpha-trifluoromethyl)-2,5-dimethyl-1-pyrrolidinethiocarboxanilide,
4'-phenoxy-2,5-dimethyl-1-pyrrolidinethiocarboxanilide,
3'-phenoxy-2,5-dimethyl-1-pyrrolidinethiocarboxanilide,
4'-(parachlorophenoxy)-2,5-dimethyl-1-pyrrolidinethiocarboxanilide,
3'-(parachlorophenoxy)-2,5-dimethyl-1-pyrrolidinethiocarboxanilide,
4'-(parafluorophenoxy)-2,5-dimethyl-1-pyrrolidinethiocarboxanilide,
3'-(parafluorophenoxy)-2,5-dimethyl-1-pyrrolidinethiocarboxanilide,
3'-methylthio-2,5-dimethyl-1-pyrrolidinethiocarboxanilide and
4'-methylthio-2,5-dimethyl-1-pyrrolidinethiocarboxanilide.

The above-mentioned and other special characteristics of the individual compounds will become apparent as the description of the invention proceeds. Where X is oxygen, R is preferably 3,4 - dichlorophenyl, 3 - trifluoromethylphenyl, 3-fluorophenyl, 4-fluorophenyl, 4-chlorophenyl, 4-methylphenyl, 3-methylphenyl, 4-phenoxyphenyl or 3-methylthiophenyl. The compounds of the aforesaid preferred subclass substantially control broadleaf weeds applied postemergence at about four pounds per acre or below.

The 2,5-dimethyl-1-pyrrolidinecarboxanilides and 2,5-dimethyl-1-pyrrolidinethiocarboxanilides have both pre-emergence and postemergence phytotoxic activity toward plants. Postemergence activity, sometimes called contact activity, is the herbicidal effect observed when the toxicant is applied directly to the foliage. Pre-emergence activity is the herbicidal effect observed when the toxicant is applied directly to the soil after the seeds are planted but before the seeds have emerged.

The new plant toxicants may be applied conveniently in the form of a spray containing the active ingredient in a concentration within the range of 0.01–50.0% by weight. For postemergence control of plants, amounts within the range of ¼ to 50 pounds per acre may be used. Thorough coverage of the foliage is recommended for effective control. For pre-emergence control of plants, amounts within the range of ¼ to 100 pounds per acre may be used.

Although most of the ureas or thioureas are insoluble in water, they are soluble in common organic solvents. Most of them are soluble in acetone, chloroform, ethyl alcohol, ethyl acetate, benzene, ether and heptane. The ureas may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecylbenzenesulfonate, an amine salt as for example dibutylammonium dodecylbenzenesulfonate, alkali metal salts of sulfated fatty alcohols, ethylene oxide condensation products of alkyl phenols, or other dispersing and wetting agents. Formulation of dry compositions is accomplished by mixing with finely divided solid carriers. Suitable carriers comprise talc, clay, pyrophyllite, silica and fuller's earth. Usually the toxicant is only a minor proportion. The dry formulation may be used as a dust or dispersed in aqueous medium before application. If the latter, it is convenient to incorporate a wetting or dispersing aid into the formulation.

The phytotoxicity of the compounds vary according to the substituents present. Some compounds are phytotoxic to both grasses and broadleaf plants, yet crop plants such as corn, wheat and rice are unharmed. Other compounds show marked specificity toward broadleaf plants. Some compounds demonstrate specificity among the grasses; of particular consequence are the compounds which have high toxicity toward crabgrass yet leave unharmed more desirable grass species.

The compounds of this invention may be used alone or in combination with other agricultural chemicals. The new compounds can be applied in compositions comprising fertilizers, insecticides, fungicides, nematocides, and other herbicides. Suitable materials may include ureas, carbamates, thiolcarbamates, dithiocarbamates, thionocarbamates, phenoxyacetic acid derivatives, benzoic acid derivatives, phenol derivatives and triazines. Compositions comprising one or more compounds of this invention with other biologically active ingredients are extremely useful. One obvious advantage of using such combinations is the accomplishment of combined objectives with a single application, thereby eliminating the need for separate applications. This is particularly advantageous when using two herbicides each having specificity for different species of noxious plants.

Contact herbicidal properties are determined by application of a spray containing a given concentration of the active ingredient to the foliage of a mixture of approximately 14 or 21 day old grasses and broadleaved plants. Approximately fourteen days later the extent of injury to the plants is observed. A rating of 0 indicates no phytotoxicity, 1 slight, 2 moderate, 3 severe phytotoxicity and a rating of 4 indicates that the plants are dead.

About fourteen days after application of the chemicals to freshly seeded pans, the pre-emergence activity was observed and recorded. The number of plants of each species which germinated and grew was counted and converted to phytotoxicity ratings. The phytotoxicity ratings are assigned in accordance with the following conversion scale:

| Percent emergence: | Phytotoxicity rating |
| --- | --- |
| 0–25 | 3 or severe. |
| 26–50 | 2 or moderate. |
| 51–75 | 1 or slight. |
| 76–100 | 0 or none. |

An illustration of the effect of 2,5-dimethyl substitution on the pyrrolidine ring is given in Table I. The only structural difference of the two compounds is the presence of two methyl groups in the 2,5- position on the pyrrolidine ring. The test plants are contacted with a spray containing 0.2 percent concentration of the toxicants at a rate of approximately 4 pounds per acre. The data show potent general herbicidal activity for the compound having methyl substituents in the pyrrolidine ring whereas the compound without them exerts little or no phytotoxicity.

TABLE I

| | Contact phytotoxicity rating | |
| --- | --- | --- |
| | Grass | Broadleaf |
| 3',4'-dichloro-1-pyrrolidinecarboxanilide | 0 | 1 |
| 3',4'-dichloro-2,5-dimethyl-1-pyrrolidinecarboxanilide | 2 | 3 |

In Table II, the data demonstrate the general phytotoxicity of 2,5-dimethyl-1-pyrrolidinecarboxanilide and the contact broadleaf specificity of 2,5-dimethyl-1-pyrrolidinethiocarboxanilide. Both contact and pre-emergence activity to grass and broadleaf plants are shown by the former. The pre-emergence data are at the rate of five pounds per acre. The postemergence data are shown at two concentrations. The two contact rates are on two different plant spectra.

TABLE II

| | | Phytotoxicity rating | | | |
| --- | --- | --- | --- | --- | --- |
| | | Contact | | Pre-emergence | |
| | Conc., percent | Grass | Broadleaf | Grass | Broadleaf |
| 2,5-dimethyl-1-pyrrolidinecarboxanilide | ¹ 0.5 | 3 | 3 | 3 | 3 |
| | ² 0.2 | 2 | 3 | | |
| 2,5-dimethyl-1-pyrrolidinethiocarboxanilide | ¹ 0.5 | 1 | 3 | 2 | 2 |
| | ² 0.2 | 0 | 2 | | |

¹ The plants treated at 0.5% concentration are grasses: wild oat, brome, ryegrass, foxtail, crab grass and sorghum almum; broadleaf weeds: morning-glory, radish, sugar beets, soybean, wild buckwheat and tomato.
² The plants treated at 0.2% concentration are grasses: corn, wheat, rice, wild oat, brome, barnyard grass, crab grass; broadleaf species: cotton, soybean, pigweed, smartweed, cocklebur, lambsquarter, coffeeweed and velvetleaf.

The presence of substituents on the benzene ring in both the ureas and thioureas results in compounds specifically active toward broadleaf plants when applied directly to the foliage. Broadleaf specificity can be achieved with substituents in the meta or para position of the phenyl portion of the ureas and thioureas. Illustrative examples of this phenomenon are given in Table III. The foliage of the test plants were treated at a toxicant concentration of 0.2 percent. Note the broadleaf specificity of all compounds having substituents on the benzene ring.

TABLE III.—POSTEMERGENCE ACTIVITY

| | Phytotoxicity rating | |
| --- | --- | --- |
| | Grass | Broadleaf |
| 4'-chloro-2,5-dimethyl-1-pyrrolidinecarboxanilide | 1 | 3 |
| 3'-chloro-2,5-dimethyl-1-pyrrolidinecarboxanilide | 1 | 2 |
| 2,4',5-trimethyl-1-pyrrolidinecarboxanilide | 1 | 3 |
| 2,3',5-trimethyl-1-pyrrolidinecarboxanilide | 1 | 4 |
| 4'-fluoro-2,5-dimethyl-1-pyrrolidinethiocarboxanilide | 1 | 3 |
| 3'-fluoro-2,5-dimethyl-1-pyrrolidinethiocarboxanilide | 0 | 3 |

General ratings of phytotoxicity toward grass and broadleaf species derived from adding phytotoxicity ratings of individual species in the plant spectra tested are obtained from the following table.

| | Range of sum of injury ratings | | | | | |
| --- | --- | --- | --- | --- | --- | --- |
| | Number of species tested | | | | | |
| | 6 | | 7 | | 9 | |
| General rating | Post-emerg. | Pre-emerg. | Post-emerg. | Pre-emerg. | Post-emerg. | Pre-emerg. |
| 0 | 0–6 | 0–4 | 0–7 | 0–5 | 0–9 | 0–6 |
| 1 | 7–12 | 5–8 | 8–14 | 6–9 | 10–18 | 7–11 |
| 2 | 13–18 | 9–12 | 15–21 | 10–14 | 19–27 | 12–18 |
| 3 | 19–23 | 13–18 | 22–27 | 15–21 | 28–35 | 19–27 |
| 4 | 24 | | 28 | | 36 | |

The broadleaf specificity of contact herbicidal properties of other examples of the compounds of this invention are given in Table IV. The data illustrate that various substituted phenyl compounds are useful for broadleaf weed control without significant injury to grasses.

In spite of the general inactivity to grasses, the compounds of this invention possess marked phytotoxicity toward crab grass. The compounds either kill crab grass completely or severely damage it and are valuable for control of crab grass.

TABLE IV.—POSTEMERGENCE ACTIVITY

| Toxicant | Conc., percent | Phytotoxicity rating | |
| --- | --- | --- | --- |
| | | Grass | Broadleaf |
| 4'-bromo-2,5-dimethyl-1-pyrrolidinecarboxanilide | 0.5 | 1 | 3 |
| 4'-fluoro-2,5-dimethyl-1-pyrrolidinecarboxanilide | 0.2 | 1 | 4 |
| 3'-nitro-2,5-dimethyl-1-pyrrolidinecarboxanilide | 0.2 | 0 | 0 |
| | 0.5 | 0 | 3 |
| 3'-(alpha, alpha, alpha-trifluoromethyl)-2,5-dimethyl-1-pyrrolidinecarboxanilide | 0.2 | 2 | 3 |
| | 0.05 | 1 | 3 |
| 3'-(methylthio)-2,5-dimethyl-1-pyrrolidinecarboxanilide | 0.2 | 2 | 4 |
| | 0.5 | 0 | 3 |
| 4'(phenoxy)-2,5-dimethyl-1-pyrrolidinecarboxanilide | 0.2 | 1 | 3 |
| 4'-chloro-2,5-dimethyl-1-pyrrolidinethiocarboxanilide | 0.2 | 0 | 2 |
| 3',4'-dichloro-2,5-dimethyl-1-pyrrolidinethiocarboxanilide | 0.2 | 1 | 3 |
| 2,4',5-trimethyl-1-pyrrolidinethiocarboxanilide | 0.5 | 1 | 3 |
| | 0.2 | 0 | 0 |
| 3'-(alpha, alpha, alpha-trifluoromethyl)-2,5-dimethyl-1-pyrrolidinethiocarboxanilide | 0.2 | 1 | 3 |
| 3'-(methylthio)-2,5-dimethyl-1-pyrrolidinethiocarboxanilide | 0.2 | 1.5 | 3 |
| 4'-(phenoxy)-2,5-dimethyl-1-pyrrolidinethiocarboxanilide | 0.2 | 0 | 2 |
| 3'-fluoro-2,5-dimethyl-1-pyrrolidinecarboxanilide | 0.2 | 2 | 3 |
| | 0.05 | 0 | 2 |

The pre-emergent herbicidal properties of some of the compounds are given in Table V. The data given are for phytotoxicity rating obtained after the toxicant is applied to the top soil at the rate of five pounds per acre. The data show that in pre-emergence application both the ureas and thioureas possess general phytotoxicity and control both weedy grasses and broadleaf plants. The halogen-substituted compounds are preferred because they demonstrate greater activity at lower concentrations.

TABLE V.—PRE-EMERGENCE ACTIVITY

| Toxicant | Phytotoxicity rating | |
|---|---|---|
| | Grass | Broadleaf |
| 4'-chloro-2,5-dimethyl-1-pyrrolidinecarboxanilide | 3 | 3 |
| 3'-chloro-2,5-dimethyl-1-pyrrolidinecarboxanilide | 2 | 2 |
| 4'-fluoro-2,5-dimethyl-1-pyrrolidinecarboxanilide | 3 | 3 |
| 2'-fluoro-2,5-dimethyl-1-pyrrolidinecarboxanilide | 2 | 2 |
| 3'-fluoro-2,5-dimethyl-1-pyrrolidinethiocarboxanilide | 3 | 2 |

The substituted phenyl 2,5 - dimethyl - 1 - pyrrolidinecarboxanilides of this invention are preferably prepared by adding an equal molar quantity of the appropriate substituted phenyl isocyanate to 2,5-dimethylpyrrolidine in an inert solvent at room temperature. The 2,5-dimethylpyrrolidine is a mixture of the cis- and trans- isomers which probably contains a major portion of the cis-form. An immediate temperature rise is observed indicating reaction; however, to assure complete reaction the reaction mixture is refluxed for a period of time, usually between one and four hours. Upon cooling, the solid carboxanilide is recovered by filtration. The liquid carboxanilides are recovered by vacuum stripping the solvent. The solid carboxanilides are recrystallized from ethyl alcohol unless otherwise specified and then submitted for analyses.

Illustrative of a typical preparation of the compounds of this invention is the preparation of 3',4'-dichloro-2,5-dimethyl-1-pyrrolidinecarboxanilide. 18.8 grams (0.1 mole) of 3,4-dichlorophenyl isocyanate is added in one portion to 10 grams (0.1 mole) of 2,5-dimethylpyrrolidine in 150 milliliters of heptane. The exothermic reaction causes a rise in temperature of the reaction mixture from 25° C. to 62° C. The stirred reaction mixture is then heated between 80° C.–90° C. for four hours. Upon cooling to 0° C., 28.5 grams (99% yield) of a solid is recovered by filtration. The melting point after recrystallization from ethyl alcohol is 141–142° C. Analysis of the product gives 19.99% and 24.90% Cl compared to 19.76% N and 24.69% Cl calculated for $$C_{13}H_{16}Cl_2N_2O$$

In a similar manner, the other carboxanilides and thiocarboxanilides are prepared by selection of the proper isocyanate or isothiocyanate. The compounds so prepared and their properties and analyses are tabulated in Table VI.

TABLE VI

| Sample No. | Name | M.P. °C. | Calculated | | | | | | Found | | | | | | Yield, percent |
|---|---|---|---|---|---|---|---|---|---|---|---|---|---|---|---|
| | | | N | Cl | Br | F | S | C H | N | Cl | Br | F | S | C H | |
| 1 | 3',4'-dichloro-2,5-dimethyl-1-pyrrolidinecarboxanilide | 141–142 | 9.76 | 24.69 | | | | | 9.99 | 24.90 | | | | | 99 |
| 2 | 2,5-dimethyl-1-pyrrolidinecarboxanilide | 119–120 a | 12.83 | | | | | | 12.72 | | | | | | 99 |
| 3 | 3'-chloro-2,5-dimethyl-1-pyrrolidinecarboxanilide | 124–125 | 11.08 | 14.03 | | | | | 11.14 | 13.98 | | | | | 98 |
| 4 | 4'-chloro-2,5-dimethyl-1-pyrrolidinecarboxanilide | 148–149 b | 11.08 | 14.03 | | | | | 11.16 | 14.09 | | | | | 98 |
| 5 | 4'-nitro-2,5-dimethyl-1-pyrrolidinecarboxanilide | 127.5–128.5 | 15.96 | | | | | | 15.87 | | | | | | 99 |
| 6 | 3'-nitro-2,5-dimethyl-1-pyrrolidinecarboxanilide | 134–135 | 15.96 | | | | | | 15.85 | | | | | | 95 |
| 7 | 2,2',5,6'-tetramethyl-1-pyrrolidinecarboxanilide | 172–173 c | 11.37 | | | | | | 11.24 | | | | | | 98 |
| 8 | 4'-bromo-2,5-dimethyl-1-pyrrolidinecarboxanilide | 140 c | 9.43 | | 26.89 | | | | 9.27 | | 26.64 | | | | 88 |
| 9 | 4',5'-trimethyl-2,5-dimethyl-1-pyrrolidinecarboxanilide | 132.0–132.5 a | 12.03 | | | | | | 12.03 | | | | | | 95 |
| 10 | 2'-chloro-2,5-dimethyl-1-pyrrolidinecarboxanilide | Amber liquid d | 11.08 | 14.03 | | | | | 11.21 | 14.36 | | | | | 98 |
| 11 | 2,2',5'-trimethyl-2,5-dimethyl-1-pyrrolidinecarboxanilide | 100–102 a | 12.06 | | | | | | 12.14 | | | | | | 98 |
| 12 | 2',5'-dichloro-2,5-dimethyl-1-pyrrolidinecarboxanilide | Viscous liquid d | 9.76 | 24.69 | | | | | 24.69 | 24.40 | | | | | 77 |
| 13 | 2',3'-trimethyl-2,5-dimethyl-1-pyrrolidinecarboxaniline | 84–85 | 12.06 | | | | | | 11.95 | | | | | | 99 |
| 14 | 2'-fluoro-2,5-dimethyl-1-pyrrolidinecarboxanilide | Amber liquid d | 11.86 | | | 8.04 | | | 12.08 | | | 8.32 | | | 99 |
| 15 | 4'-fluoro-2,5-dimethyl-1-pyrrolidinecarboxanilide | 139–140 | 11.86 | | | 8.04 | | | 12.08 | | | 8.09 | | | 100 |
| 16 | 2'-(alpha, alpha, alpha-trifluoromethyl)-2,5-dimethyl-1-pyrrolidinecarboxanilide | Viscous liquid d | 9.79 | | | 19.91 | | | 9.91 | | | 19.89 | | | 98 |
| 17 | 3'-methylthio-2,5-dimethyl-1-pyrrolidinecarboxanilide | 68–73 a | 10.60 | | | | 12.11 | | 10.76 | | | | 12.37 | | 100 |
| 18 | 3'-(alpha, alpha, alpha-trifluoromethyl)-2,5-dimethyl-1-pyrrolidinecarboxanilide | 131–133 a | 9.79 | | | 19.91 | | | 9.80 | | | 20.27 | | | 90 |
| 19 | 4'-phenoxy-2,5-dimethyl-1-pyrrolidinecarboxanilide | 122–126 a | 9.03 | | | | | 73.52 7.14 | 8.77 | | | | | 73.22 7.27 | 97 |
| 20 | 3',4'-dichloro-2,5-dimethyl-1-pyrrolidinethiocarboxanilide | 140–141 | 9.24 | 23.38 | | | 10.57 | | 9.13 | 23.21 | | | 10.83 | | 98 |
| 21 | 4'-chloro-2,5-dimethyl-1-pyrrolidinethiocarboxanilide | 165.0–165.5 | 10.42 | 13.19 | | | 11.93 | | 10.31 | 13.16 | | | 12.07 | | 99 |
| 22 | 4',5'-trimethyl-2,5-dimethyl-1-pyrrolidinethiocarboxanilide | 117–118 | 11.28 | | | | 12.91 | | 11.48 | | | | 13.12 | | 88 |
| 23 | 2',3',4',5'-tetramethyl-2,5-dimethyl-1-pyrrolidinethiocarboxanilide | 123–124 a | 10.68 | | | | 12.22 | | 10.44 | | | | 12.30 | | 94 |
| 24 | 2,5-dimethyl-2,5-dimethyl-1-pyrrolidinethiocarboxanilide | 100.5–101.5 a | 11.95 | | | | 13.68 | | 12.04 | | | | 13.44 | | 88 |
| 25 | 3'-nitro-2,5-dimethyl-1-pyrrolidinethiocarboxanilide | 124–125 | 15.04 | | | | 11.48 | | 14.92 | | | | 11.63 | | 98 |
| 26 | 4'-nitro-2,5-dimethyl-1-pyrrolidinethiocarboxanilide | 139.5–140.0 | 15.04 | | | | 11.48 | | 14.89 | | | | 11.57 | | 96 |
| 27 | 2'-fluoro-2,5-dimethyl-1-pyrrolidinethiocarboxanilide | 74.5–75.5 a | 11.10 | | | | | | 11.45 | | | | | | 86 |
| 28 | 4'-fluoro-2,5-dimethyl-1-pyrrolidinethiocarboxanilide | 133–134 | 11.10 | | | | 12.71 | | 11.23 | | | | 12.57 | | 89 |
| 29 | 2'-(alpha, alpha, alpha-trifluoromethyl)-2,5-dimethyl-1-pyrrolidinethiocarboxanilide | 83–84 a | 9.27 | | | | 10.61 | | 9.12 | | | | 10.66 | | 93 |
| 30 | 3'-fluoro-2,5-dimethyl-1-pyrrolidinethiocarboxanilide | 95–96 c | 11.10 | | | | | | 11.01 | | | | | | 87 |
| 31 | 3'-methylthio-2,5-dimethyl-1-pyrrolidinethiocarboxanilide | 90–91 a | 9.99 | | | | 22.87 | | 9.91 | | | | 23.04 | | 89 |
| 32 | 4'-phenoxy-2,5-dimethyl-1-pyrrolidinethiocarboxanilide | 138–139 | 8.58 | | | | 9.82 | | 8.60 | | | | 9.67 | | 100 |
| 33 | 3'-(alpha, alpha, alpha-trifluoromethyl)-2,5-dimethyl-1-pyrrolidinethiocarboxanilide | 124–125 a | 9.27 | | | | 10.61 | | 9.46 | | | | 10.69 | | 99 |
| 34 | 3'-fluoro-2,5-dimethyl-1-pyrrolidinecarboxanilide | 97–107 a | 11.86 | | | 8.04 | | | 12.13 | | | 8.29 | | | 68 | a Recrystallized from heptane. b Recrystallized from toluene. c Recrystallized from ethyl acetate. d Solvent removed at 80–90° C. at 1–2 mm.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The compound 3'-(methylthio)-2,5-dimethyl-1-pyrrolidinecarboxanilide.
2. The compound 4'-(phenoxy)-2,5-dimethyl-1-pyrrolidinecarboxanilide.
3. The compound 3'-(methylthio)-2,5-dimethyl-1-pyrrolidinethiocarboxanilide.
4. The compound 4'-(phenoxy)-2,5-dimethyl-1-pyrrolidinethiocarboxanilide.

References Cited
UNITED STATES PATENTS 3,639,608  2/1972  Adams et al. _____ 424—274

JOSEPH A. NARCAVAGE, Primary Examiner

U.S. Cl. X.R.

260—326.83; 71—95